US011768343B2

(12) United States Patent
Chandrasekaran et al.

(10) Patent No.: US 11,768,343 B2
(45) Date of Patent: Sep. 26, 2023

(54) CONTACTLESS OPTICAL FIBER INTERNET CUSTOMER PREMISES INSTALLATION

(71) Applicant: Tucows (Delaware) Inc., Toronto (CA)

(72) Inventors: Mariram Chandrasekaran, Scarborough (CA); Ryan Turner, Westminster, MD (US); Jonathan Jopse, Westminster, MD (US)

(73) Assignee: Tucows Inc., Toronto (CA)

( * ) Notice: Subject to any disclaimer, the term of this patent is extended or adjusted under 35 U.S.C. 154(b) by 28 days.

(21) Appl. No.: 16/901,476

(22) Filed: Jun. 15, 2020

(65) Prior Publication Data

US 2021/0392058 A1    Dec. 16, 2021

(51) Int. Cl.
| | |
|---|---|
| *G02B 6/46* | (2006.01) |
| *F16B 13/06* | (2006.01) |
| *H01B 11/22* | (2006.01) |
| *G01S 13/04* | (2006.01) |
| *F21V 8/00* | (2006.01) |
| *G02B 6/38* | (2006.01) |

(52) U.S. Cl.
CPC ............ *G02B 6/475* (2023.05); *F16B 13/065* (2013.01); *G01S 13/04* (2013.01); *G02B 6/0046* (2013.01); *G02B 6/3887* (2013.01); *H01B 11/22* (2013.01)

(58) Field of Classification Search
None
See application file for complete search history.

(56) References Cited

U.S. PATENT DOCUMENTS

| | | | | | |
|---|---|---|---|---|---|
| 4,324,503 | A | * | 4/1982 | Severence | ................ F16C 1/262 403/197 |
| 2008/0218947 | A1 | * | 9/2008 | Atkinson | ................. H04Q 1/03 361/622 |
| 2012/0268308 | A1 | * | 10/2012 | Tuttle | .................... G01S 13/282 342/104 |

(Continued)

FOREIGN PATENT DOCUMENTS

CN          1977187 A * 6/2007 ............. G01V 3/081

OTHER PUBLICATIONS

Ryan Randazzo, "Cox workers won't go in your house to fix internet connections", Apr. 2020, Arizona Republic, www.azcentral.com/story/money/business/consumers/2020/04/17/coronavirus-arizona-internet-providers-home-installations-covid-19-news/5133858002/ (Year: 2020).*

(Continued)

*Primary Examiner* — Chad H Smith
(74) *Attorney, Agent, or Firm* — John Berryhill

(57) ABSTRACT

A method and apparatus for contactless installation of an optical fiber internet connection at a customer premises is provided, wherein the customer is provided with an interior installation kit and is guided by an installation technician. The customer remains inside the premises, selects an entry point for the fiber, and indicates the entry point to the technician using a remote detection target. The technician locates the detection target, bores a hole into the premises, passes an optical fiber in to the customer, and the customer secures an attachment mount to the interior wall of the premises to receive the optical fiber and upon which to connect and mount an optical network terminal. After the optical fiber has been connected, the customer network is activated, and the technician seals the external hole.

6 Claims, 10 Drawing Sheets

(56) References Cited

U.S. PATENT DOCUMENTS

2013/0291363 A1* 11/2013 Dacey ...................... G02B 6/46
29/428

OTHER PUBLICATIONS

CenturyLink ("Safe Connections Installation & Repair Partnership Process" file:///C:/Users/csmith2/Downloads/COVID_SafeConnectionsFlyer_rev041320%20(2).pdf (Year: 2020).*
CenturyLink flyer with created date (Year: 2020).*

* cited by examiner

CONTACTLESS OPTICAL FIBER INTERNET CUSTOMER PREMISES INSTALLATION

FIELD OF THE INVENTION

The present invention relates to the field of installation of customer premises utility line installation, such as optical fiber customer premises connection.

BACKGROUND

Performing customer premises installation of utilities, such as coaxial cable or optical fiber cable television or internet is fraught with a variety of risks. Utility installation technicians have traditionally had to contend with pets, trip and fall hazards or other injurious conditions giving rise to potential liability disputes among the installer, the utility company and the customer. Additionally, some customers are uncomfortable with having technicians enter their home to perform installations due to such concerns as their personal security or the security of valuables in their home. More recently, the COVID-19 pandemic has increased demand for high-speed residential internet installations, as more persons are working from home via the internet. However, the same pandemic which is driving increased demand has also made it desirable to perform utility installation while maintaining social isolation, lockdown, or even quarantine conditions. Accordingly, there is a need for methods and apparatus which render it possible to conduct customer premises installations of utilities without requiring entry into the customer premises by the installation technician.

SUMMARY OF THE INVENTION

In accordance with the present invention, there are provided methods and apparatus for performing a customer premises installation while maintaining social distancing between the customer and an installation technician. The customer is provided with a kit containing components which require no tools to assemble. The kit includes an optical network terminal and a wall attachment plate for securing the optical network terminal at an entry point for an optical fiber to enter the premises through an exterior wall. The entry point is selected by the customer while the customer remains inside of the premises and the installation technician remains outside of the premises. After the entry point is selected, the installation technician determines the corresponding location on the exterior side of the exterior wall, bores a hole through the wall, and passes the optical fiber to the customer through the hole. The customer then connects the fiber to the optical network terminal, and secures the optical network terminal to the interior side of the wall with the wall attachment plate using the kit components of the invention which do not require the use of any tools.

DESCRIPTION OF THE DRAWINGS

Additional aspects and embodiments of the present invention will be made apparent in the Detailed Description and best understood in connection with the attached drawings, in which:

FIG. 6 is a perspective view of an interior bushing installed in accordance with an embodiment of the invention;

FIG. 7 is a perspective view installed wall plate configured in accordance with an embodiment of the invention.

DETAILED DESCRIPTION OF THE INVENTION

Figure 1:
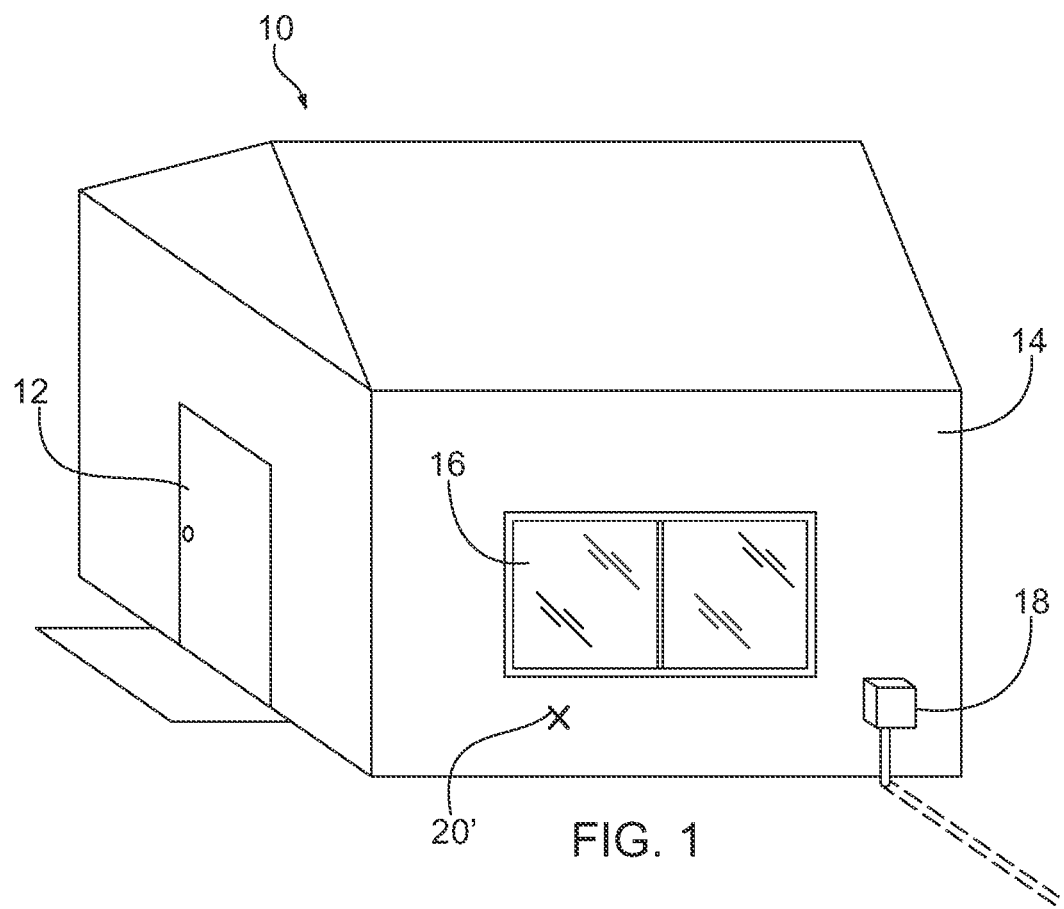
FIG. 1 is a perspective view of a customer premises.

In FIG. 1, there is shown a customer premises, such as a residential house 10 at which installation of a utility service line is desired. In the preferred embodiment, the utility line is a fiber optic cable which can carry various multiplexed data services, such as internet, television and voice services. In order to obtain the service, the customer places an order with the utility service provider for the installation. The utility service provider and the customer arrange an installation appointment during which the customer (or an agent or family representative of the customer) will be on the premises for the cooperative, guided installation process.

The utility service provider schedules an installation technician for the installation appointment. The installation technician arrives at the premises 10 and places an installation kit at an entrance 12 to the premises 10. In an alternative embodiment, the installation kit may be delivered in a container such as a cardboard delivery box to the customer prior to the installation technician's arrival at the premises. The exterior of the installation kit may optionally be disinfected by the technician upon arrival, or by the customer upon delivery. The components of the installation kit are identified in sequence below.

The customer takes the installation kit inside the premises 10. During the installation process, the customer remains inside the premises 10 while the installation technician remains outside of the premises. The kit preferably includes an Optical Network Terminal (ONT), its power supply, and a wall attachment assembly, along with a remote detection target described further below. The preferred ONT, for example an ADTRAN Model 401 Micro FTTH (fiber-to-the-home) Indoor ONT, provides a terminal for the incoming fiber optic line, demultiplexes its signal into its component parts (e.g. voice telephone, television, and Internet access), and provides a local Ethernet connection, which the customer may further connect to a router. If the customer does not desire to provide their own router, then the kit may further include a router and an ethernet cable for connecting with the ONT, along with its power supply. The kit may also include one or more mesh routers, for a mesh router-based installation, or the customer may have already have a mesh router network operative at the premises. The kit may optionally include one or more disinfectant wipes for further disinfecting the components of the kit and for collecting debris during the installation process.

In a preferred embodiment, the customer and the installation technician establish a live or near-live communication channel, such as a telephone call initiated to the customer by the technician in accordance with the installation request data, or are provided with the ability to exchange text messages, emails or the ability to relay messages through another party, such as a translator. The installation technician may instruct the customer to retrieve the installation kit from the entrance, if the customer has not already received the installation kit.

The installation technician then instructs the customer to select an entry point on the interior side of an external wall of the premises. In a preferred embodiment the technician instructs the customer to select an entry point on the interior side of an exterior wall 14 beneath a ground-floor window 16. Such an entry point is advantageous for several reasons. Such a position allows the customer and the installation technician to see each other, which facilitates communication while maintaining physical separation. Additionally, undesired and potentially hazardous obstacles, such as electrical wiring, plumbing, etc., are less frequently routed beneath windows; and the final installation may be effectively hidden behind drapes, if present. In general, the entry point is preferably chosen so that the technician outside, and the customer inside, can determine a common reference feature at which to either locate the entry point, or from which the entry point may be determined by measuring a distance and direction from the common reference feature. Such a feature may be a window, as shown, or may be a location where other utilities enter the premises, a corner of the premises, or some other architectural feature of the premises at which the entry point may be located, or from which the distance from the common reference feature may be measured. In alternative embodiments, the customer kit includes a measuring device, such as a paper measuring tape, so that the customer may measure the distance from the common reference feature to the entry point, and communicate the distance and direction to the technician outside, such as by verbally description or sending a photograph.

Figure 2:
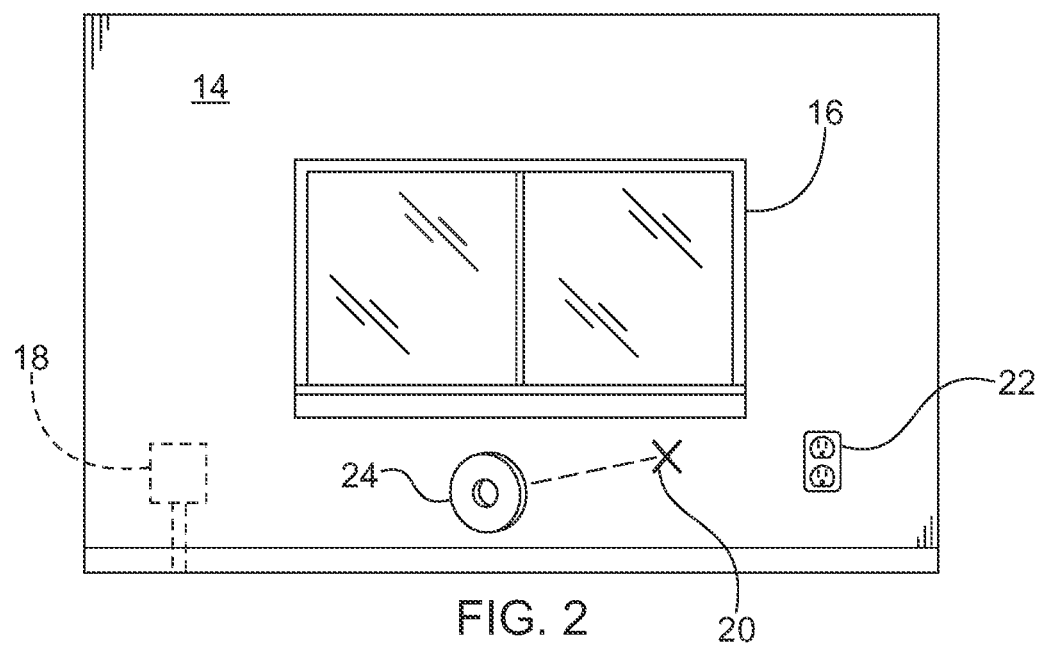
FIG. 2 is an elevational view of the interior side of an exterior wall of the customer premises.

Referring now to FIG. 2 wherein there is shown an interior view of the wall 14, it is desirable for the entry point 20 to be located within a maximum distance to an electrical outlet 22, determined by the length of any power cord supplied with the ONT. However, it is also preferred for the entry point 20 not to be located below a minimum specified distance from an electrical outlet, such as outlet 22, or other junction box, such as a switch, to avoid having to drill into the wall within the vicinity of electrical cabling. Additionally, the entry point 20 should be located above the floor at a sufficient height to provide clearance for the ONT and the wall attachment plate.

The installation technician may further direct the customer to a location within a specified range of distance to an external Network Interface Device (NID) 18 which provides the local interface to the utility network, such as through a buried cable. In the preferred embodiment, the customer takes a picture of the interior side of the wall 14 and then transmits the picture, such as by text or email, to the installation technician. Preferably, the picture taken by the customer shows the entire wall from floor to ceiling, in the area of the entry point, so that the installation technician can visually confirm that the entry point satisfies the various selection criteria, and can guide the customer further in selecting the entry point if the initial selection is unsatisfactory.

After the entry point 20 has been selected on the interior side of the exterior wall 14, the installation technician locates a bore point 20' on the exterior side of the exterior wall 14 corresponding to the location of the entry point 20. The bore point 20' may be located by having the customer indicate the location of the entry point in the photograph sent to the technician, and by using measurements from a common reference feature as noted above, such as a corner of the window 16, to determine the bore point 20', or at least the approximate location of the bore point 20'. In the preferred embodiment, the installation kit includes a common one-inch steel washer 24 which the customer is instructed to hold adjacent to the interior surface of the wall 14 at the entry point 20, in order to act as a remote detection target. The installation technician, working on the outside, then scans the wall in the vicinity of the bore point 20' using a wall scanner known in the art, such as a Bosch 150 wide band radar wall scanner (not shown).

The installation technician uses the wall scanner to detect the washer 24 and its position, and thus to locate the bore point 20'. In the preferred embodiment, the customer is instructed to further indicate the entry point 20 by alternately placing and removing the washer 24 from the entry point 20, so that the alternating presence and absence of the washer detected by the technician's device unambiguously locates the bore point 20', which can then be marked by the installation technician on the exterior surface of the wall 14. The installation technician further uses the wall scanner to determine whether there are any undesired or hazardous obstacles within the wall at the chosen entry point, such that selection of an alternative entry point would be indicated. As can be readily appreciated, a variety of techniques to locate the bore point 20' may be used in alternative embodiments, such as by the use of ultrasonic, magnetic or electromagnetic detectors, and corresponding detection targets such as magnets, ultrasonic or electromagnetic resonators or other technological equivalents providing the ability to remotely indicate the interior entry point 20 location through the wall such that the corresponding exterior bore point 20' can be determined.

Figure 3:
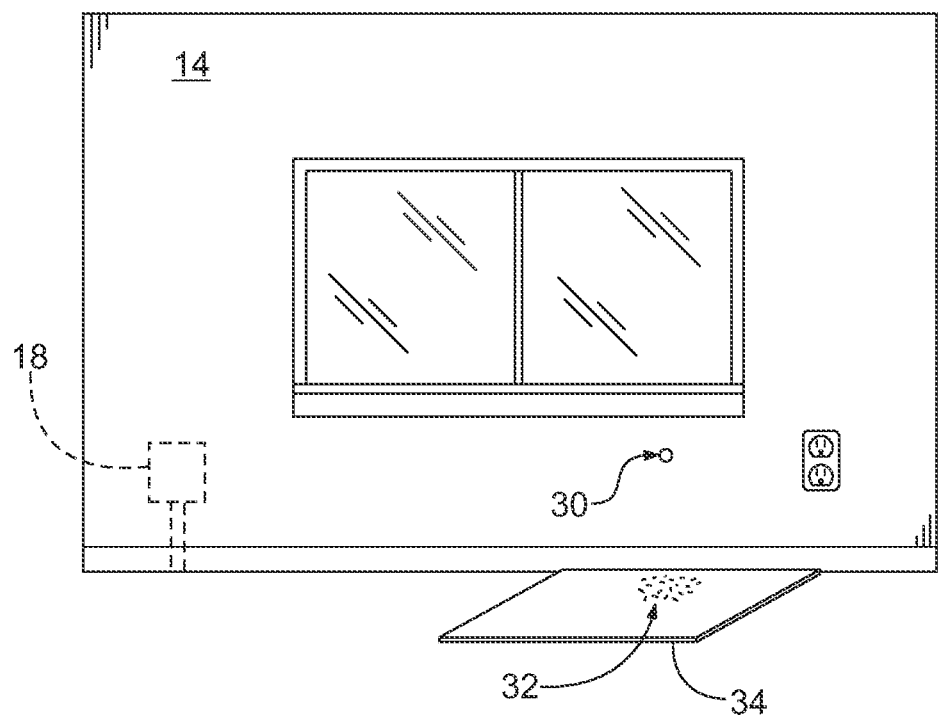
FIGS. 3-4, FIGS. 6-8 and FIGS. 10-13 are elevational views of the interior side of the interior wall of FIG. 2, at respective further installation steps according to an embodiment of the invention.

Once the bore point 20' has been located, the technician proceeds to bore a hole through the wall to the entry point 20. The customer is preferably instructed to ensure that furniture or other objects are removed beyond three feet from the entry point and that pets and children are removed from the immediate area. Referring now to FIG. 3, because the hole 30 is bored from the outside to the inside, then entry of the drill bit (not shown) through the interior wall 14 may produce debris 32 that will accumulate on the floor. Accordingly, the customer may further be instructed to place a receptacle or dropcloth, such as a disinfectant wipe 34 from the installation kit, on the floor beneath the entry point to catch and dispose of such debris 32.

In the preferred embodiment, the installation technician proceeds to drill a one-half inch hole through the wall. While drilling the hole, the installation preferably stops from time to time, removes the drill bit from the partially-completed hole, and inspects the inside of the wall with an endoscope, to visually confirm the absence of any undesired obstacles that may have gone previously undetected. The installation technician additionally stops to inspect the cause of any unusual tactile sensation during drilling which may indicate the presence of an undesired obstacle.

Once the hole has been drilled, the installation technician runs an optical fiber jumper along the exterior of the premise from NID to the hole. The fiber jumper preferably has a terminating connector of a known type such as an SC (subscriber connection or standard connection) optical fiber connector, which provides a protective end cap for the fiber and is sized to fit through the one-half inch hole. The installation technician leaves enough slack beyond the distance from the NID 18 to the hole 30 for the connectorized end of the fiber jumper to enter the hole, pass through the wall cavity, and provide an additional length of slack fiber on the inside, such as five inches.

Once the installation technician has sized the fiber jumper, the technician splices the fiber jumper to the fiber drop in the NID 18. The installation technician makes an index mark on the fiber jumper at a position indicating the length of desired interior slack fiber, such as five inches from the connectorized end of the fiber jumper. Before inserting the connector end of the fiber jumper into the hole, the installation technician may check the service by connecting a portable ONT to the fiber and running a diagnostic test on the network connection. If the network connection is satisfactory, the installation technician disconnects the fiber jumper from the portable ONT, cleans the fiber end, and replaces the protective cap provided with such connectors. Finally, prior to inserting the connectorized end of the fiber jumper into the hole, the installation technician disinfects the connectorized end of the fiber jumper along with the length of cable to be inserted into the hole, such as with a bleach or alcohol disinfectant solution and a paper towel or pre-moistened wipe.

Figure 4:
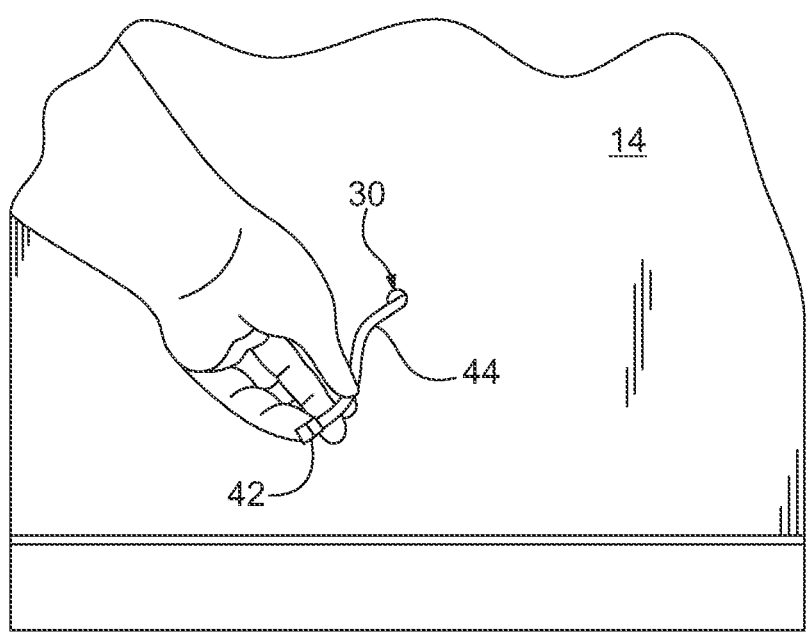

The customer is instructed to retrieve the ONT and wall attachment assembly from the installation kit and to wait to receive the fiber jumper through the hole. Referring to FIG. 4, the installation technician pushes the connectorized end 42 of the fiber jumper 44 through the wall 14 using either a piece of conduit or a wire push tool. When the connector end 42 of the fiber jumper 44 emerges from the interior side of the wall 14, the customer is instructed to grasp the connector 42 while the technician pulls the push tool back out of the entry hole. The customer then pulls the fiber 44 further inside, until the customer sees the index mark on the cable indicating the interior slack length to be maintained during the rest of the installation.

After the cable jumper 44 has been fed to the inside of the premises as shown in FIG. 4, the technician may guide the customer through the process of attaching the cable 44 to the ONT and securing the ONT to the interior surface of the wall 14.

Figure 5A:
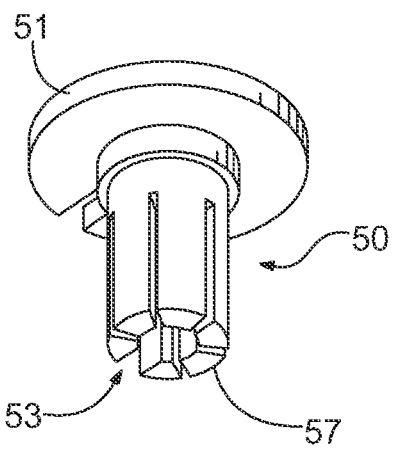
FIGS. 5A and 5B are perspective views of a cooperating bushing and expansion insert according to an embodiment of the present invention.
Figure 5B:
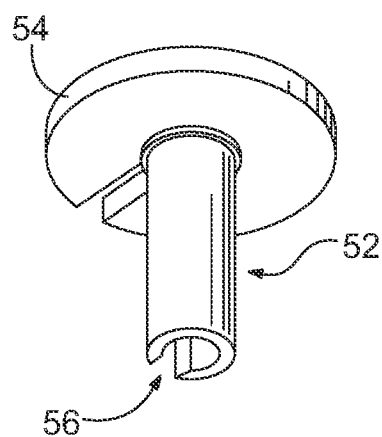

In one embodiment of the invention, the wall attachment assembly includes a bushing 50 and an expansion insert 52 shown in FIG. 5. The bushing 50 has a tubular body sized to be inserted into the hole in the wall, and further has an enlarged head forming a rim at the head end 51 of the body. A longitudinal channel 53 is formed along the body and through the head end of the bushing to accommodate lateral insertion and coaxial positioning of the fiber optic cable along the longitudinal axis within the central cavity of the bushing. The expansion insert 52 comprises a tubular body and sized to be longitudinally inserted into the bushing. The expansion insert 52 likewise has an enlarged head end 54 with a longitudinal channel 56 formed along the body and the head of the expansion insert to accommodate lateral insertion and coaxial positioning of the fiber optical cable. Two or more expansion fingers 57 form the elongated tubular portion of the body of the bushing 50. The interior surfaces of the expansion fingers 57 are sloped inward toward the central channel so that they will expand outward when the expansion insert 52 is longitudinally inserted into the head end of the bushing 50. The exterior surface of the tubular body of the expansion insert 52 may further have ridges or other texture formed thereon to cooperatively engage with similar ridges or complementary texture formed along the interior tubular surface of the bushing 50, and thus be firmly held in place after insertion. In a preferred embodiment, engagement of the expansion insert 52 and the bushing 50 is enhanced by manufacturing the components using a 3D printing technique which, as a consequence of the finite registration tolerance of 3D printed layers, results in the formation of ridges along the exterior surface of the expansion insert and the interior surfaces of the bushing 50.

Figure 6:
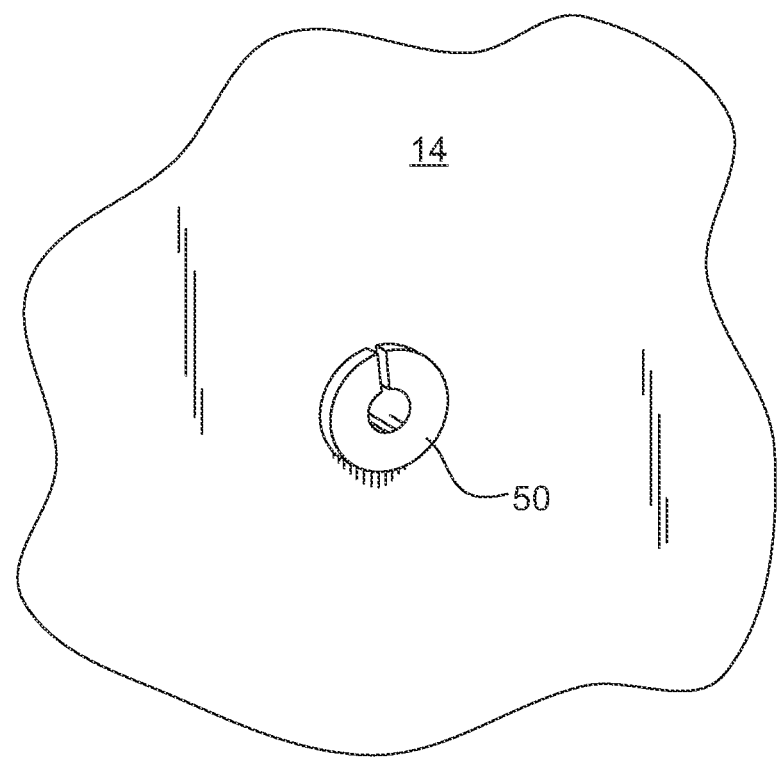

With the fiber cable having been received into the premises, the customer is instructed to maintain the index mark just inside the wall, and to position the fiber laterally into the central tubular cavity of the bushing, so that the fiber is coaxially positioned within the bushing. Keeping the fiber at the same insertion distance the bushing is then pressed into the hole in the wall as shown in FIG. 6.

Figure 7:
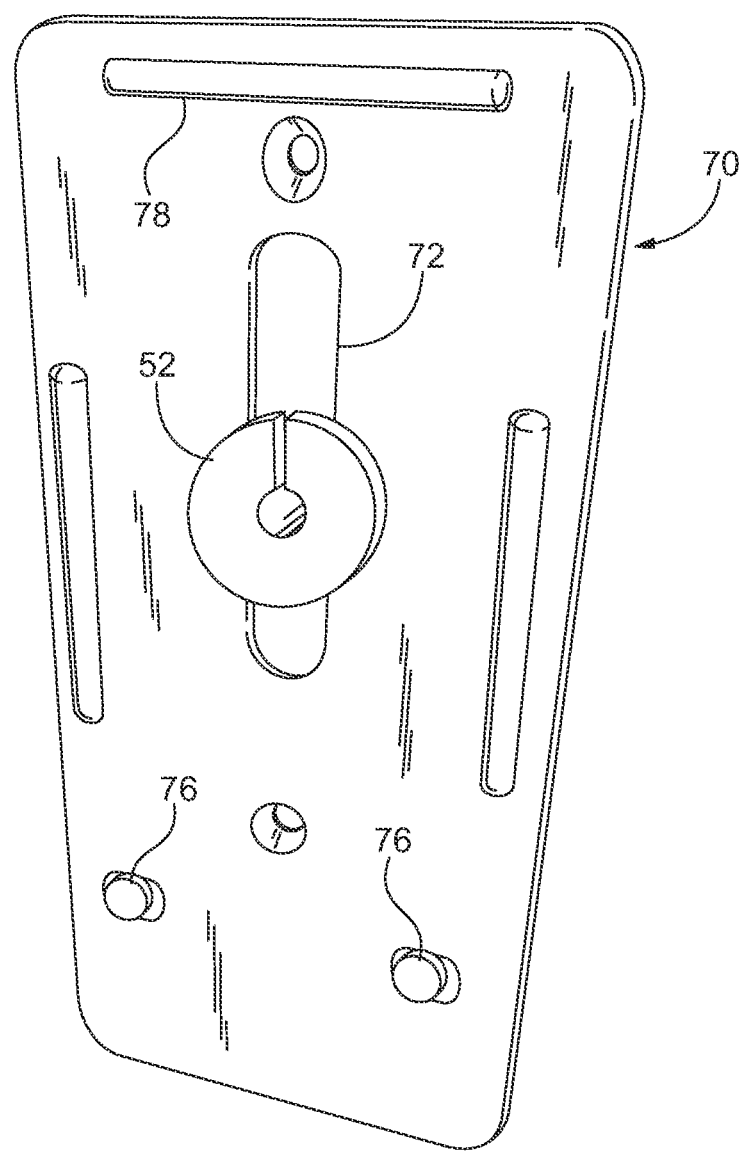

The wall attachment assembly included in the installation kit further comprises a wall plate 70, as shown in FIG. 7. In a preferred embodiment, the wall plate 70 is formed to provide an aperture 72 through which the optical fiber may be guided, and is further configured to provide a mounting fixture for the ONT. The mounting fixture formed on the wall plate may comprise a pair of bosses 76 onto which the ONT housing may be affixed by cooperating keyhole receptacles formed in the ONT housing. In other embodiments, the wall plate may be configured to provide a secure mounting for the ONT by various attachment mechanisms such as screws, adhesives, or by integral formation of the wall plate with the ONT housing itself. The wall plate may further be provided with an adhesive backing covered by a protective backing sheet (not shown), which the customer is instructed to remove from the wall plate prior to feeding the cable through the aperture of the wall plate, aligning the aperture with the bushing, and securely pressing the wall plate onto the wall. In the presently-described embodiment, the wall plate 70 has a recess formed into the wall-facing side of the plate 70, in order to receive the head of the bushing 50 into such recess and permit the wall plate to be positioned flush against the interior surface of the wall. The wall plate 70 preferably further includes a mounting fixture for a cable housing cover, such as ridges 78 onto which a cable housing cover (not shown) may be friction, compression, or snap fit onto the plate 70 as discussed further below, when installation is complete.

The customer then laterally positions the fiber cable into the expansion insert 52, such that the cable is coaxially positioned within the insert and the body of the insert is oriented toward the bushing. The expansion insert 52 is then pressed into the bushing 50, causing the fingers of the bushing 50 to expand outward and gripping onto the inside surface of the wall cavity, thus providing an expansion anchor further securing the wall plate 72 to the interior side of the wall 14. As may be appreciated, in alternative embodiments, the wall plate may be optionally secured to the wall by either the adhesive or the bushing alone or in combination.

Figure 8:
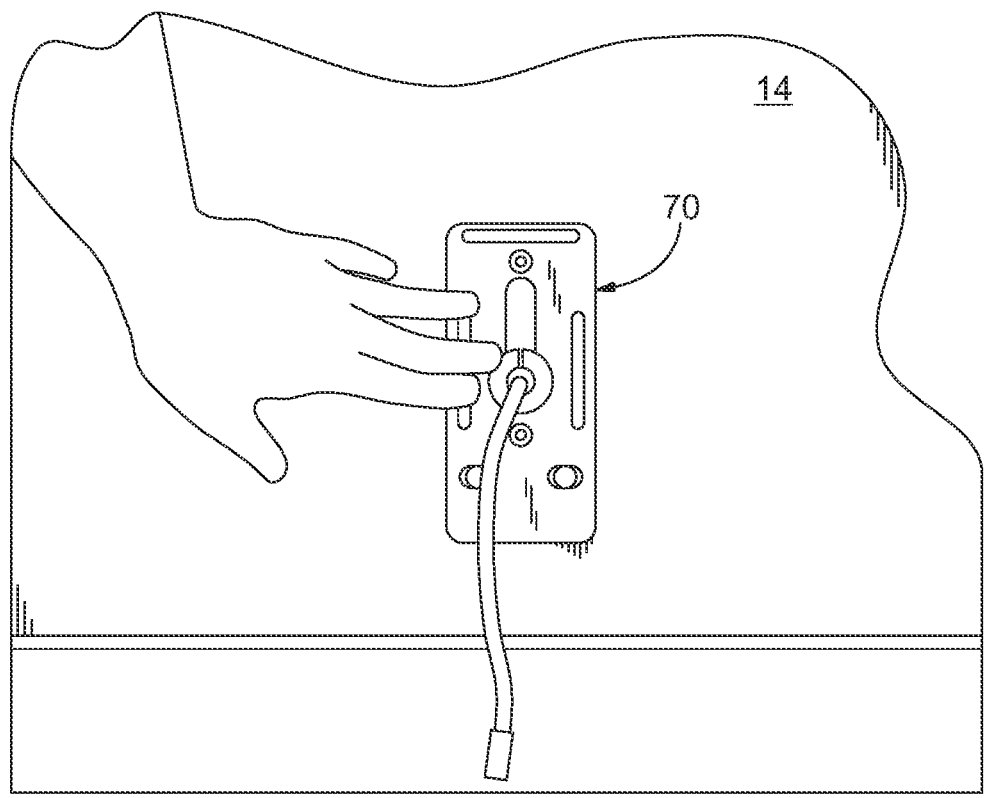
Figure 9A:
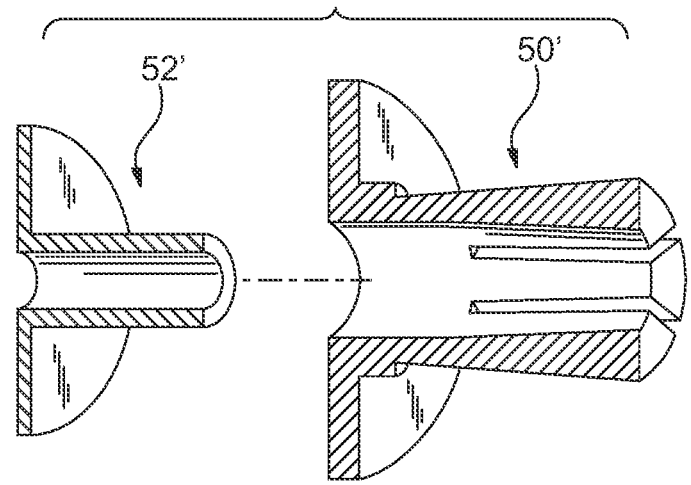
FIGS. 9A and 9B are respective cutaway and perspective views of a cooperating bushing and expansion insert utilized in an embodiment of the invention.
Figure 9B:
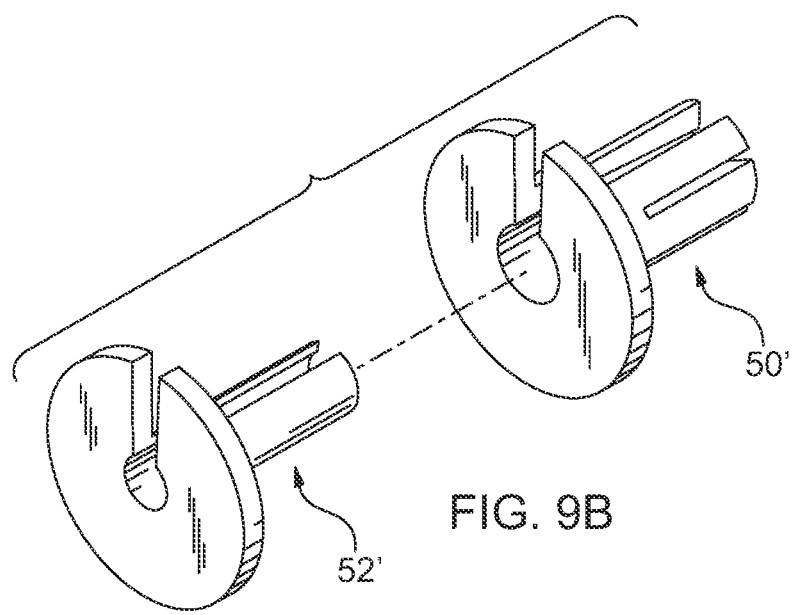

In a further alternative embodiment, the fiber cable is threaded through the aperture in the wall plate which is initially secured to the wall by adhesive, as shown in FIG. 8. Then, a bushing 50' and the expansion insert 52' shown in FIG. 9A and FIG. 9B, which operate in a similar manner to the previously-described alternatives, are inserted into the wall plate after the wall plate is positioned against the wall. The bushing 50' likewise has a tubular body, an enlarged head, and, a longitudinal channel into which the fiber may be laterally inserted and coaxially positioned therein, and two or more fingers formed along the tubular body with inward tapering surfaces, such that the fingers are deformed radially outward when the expansion insert is pushed into the bushing, in order to securely grip the drywall from the inside of the wall and hold the attachment plate in place. This most preferred embodiment more readily permits removal of the expansion insert and the bushing, in the event the equipment is later to be removed or repositioned.

Figure 10:
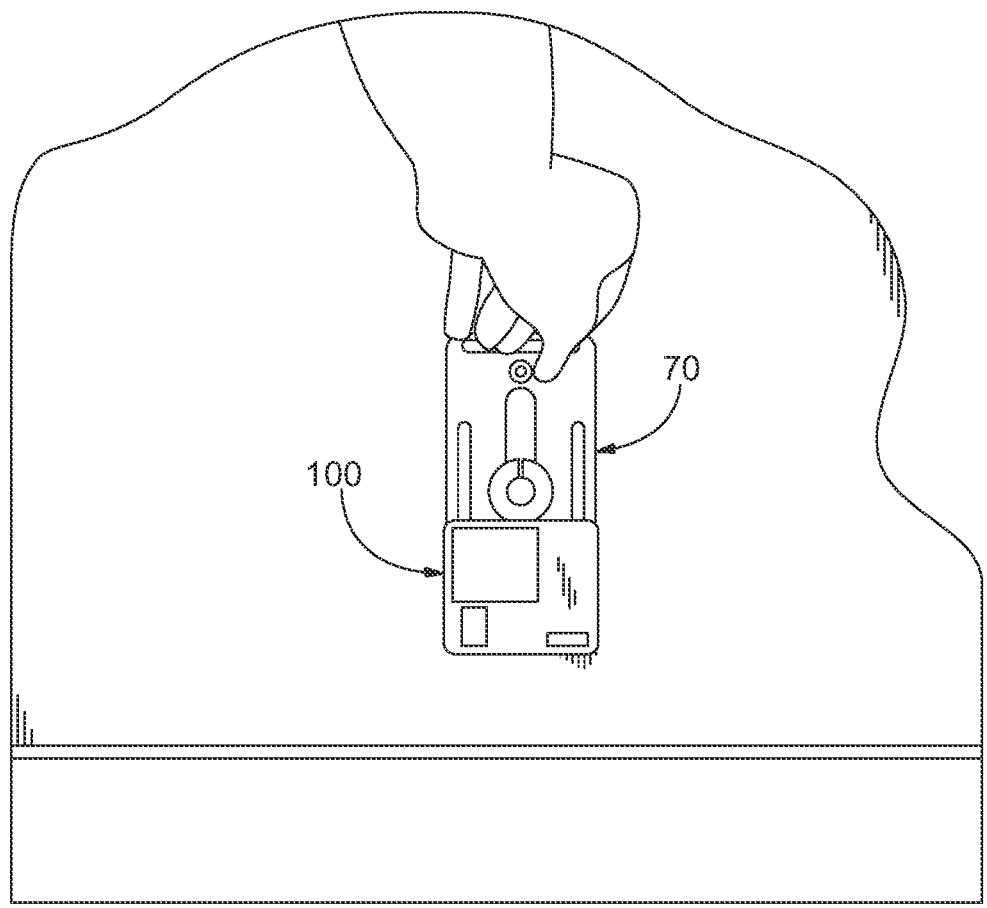
Figure 11:
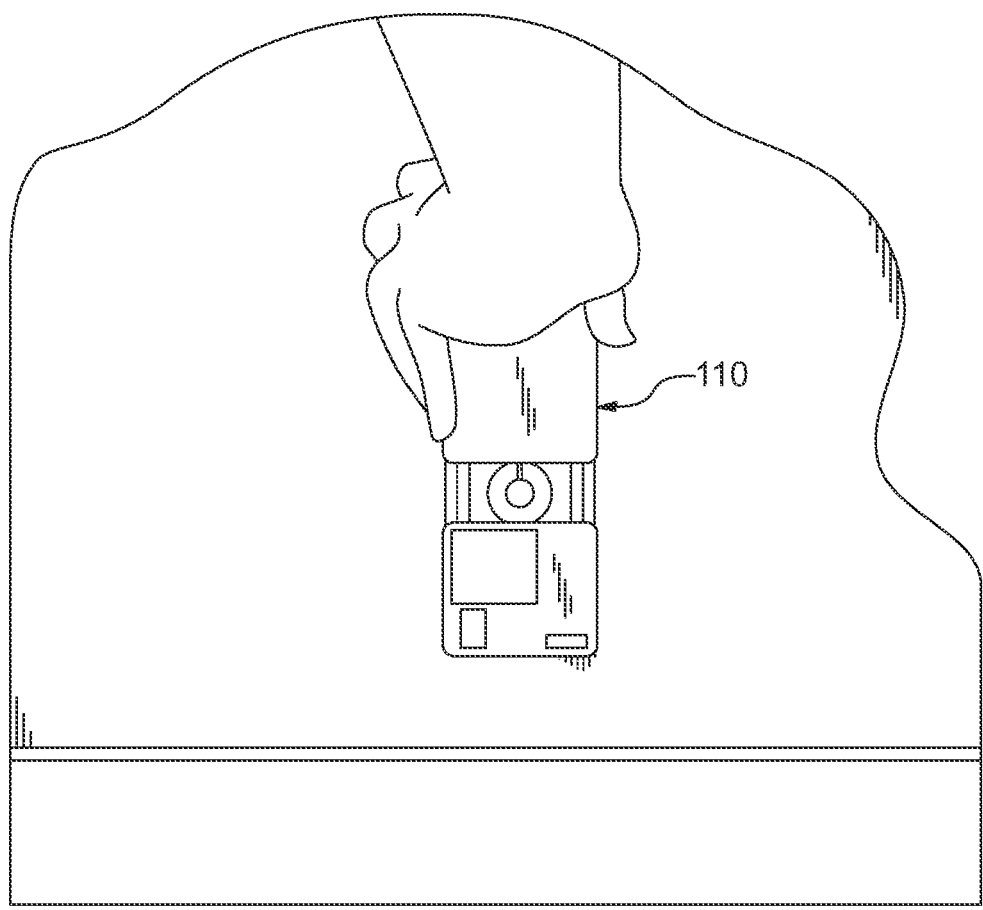

Once the wall plate has been secured to the wall, the customer removes the protective cap from the fiber connector and connects the fiber connector into fiber port on the top of the ONT. As shown in FIG. 10, the customer then mounts the ONT 100 to the wall plate by positioning the keyhole receptacles on the back of the ONT 100 housing on the bosses of the wall plate 70. As shown in FIG. 11, the customer then mounts a cable housing cover 110 onto the wall plate over the exposed aperture section of the wall plate, such that the interior slack cable is contained within the housing. The cable housing 110 is preferably configured to be received in a slide, press or snap fit onto the wall plate.

Figure 12:
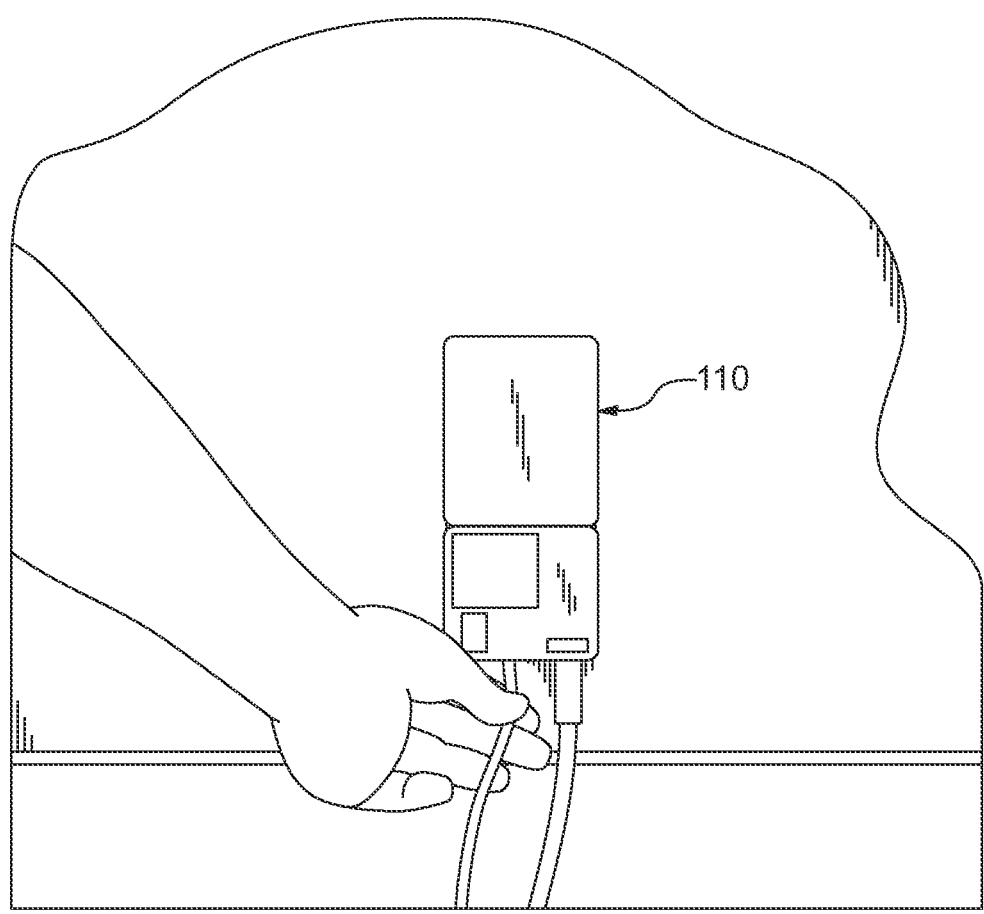
Figure 13:
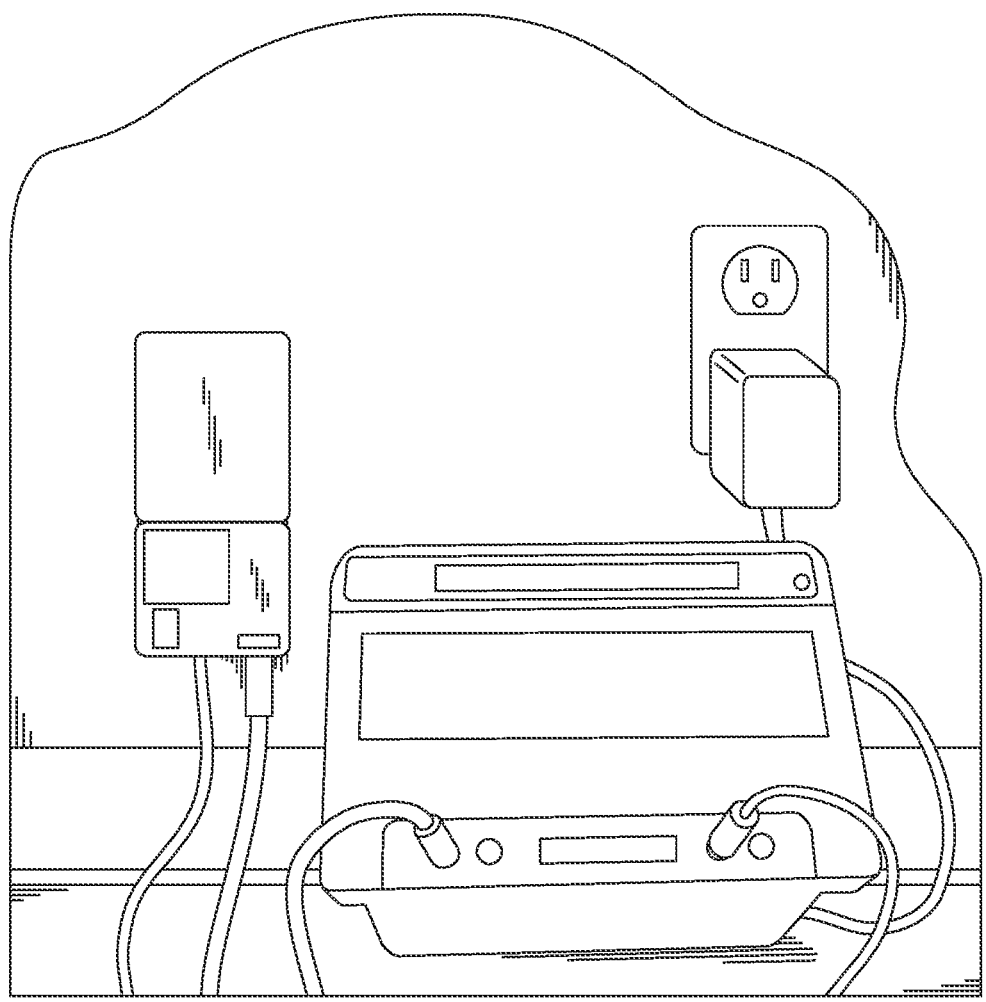

The customer may then connect the ONT power supply cable to the power outlet and connect one end of an ethernet cable to the ethernet port of the ONT as shown in FIG. 12. Then, the customer may connect the other end of the ethernet cable to the customer's router, and connect the router's power supply to the electrical outlet, as shown in FIG. 13. In a preferred embodiment, the router is a WiFi router of a known type preconfigured to provide subscriber access to the service provider's network. Such preconfiguration also permits the installation technician to connect a portable device to the network via the WiFi connection, in order to confirm the customer has established an operative connection to the service provider's network or determine whether any troubleshooting is required.

Once the installation is completed, the installation technician may install a slotted bushing, such as shown and described in connection with FIGS. 5A-B or FIGS. 9A-B around the cable at the exterior bore point, and then seal the hole with a weatherproof sealant such as a silicone sealant of a commonly known type.

The foregoing detailed description is intended to describe the invention by way of example and is not intended to limit the scope of the invention within the broadest meaning of the appended claims.

What is claimed is:

1. A method for performing installation of an internet connection at the premises of a customer, comprising the steps of:
    (a) providing the customer with a customer premises equipment kit comprising a wall attachment, an optical network terminal adapted to connect with the wall attachment;
    (b) the customer selecting on an interior side of an external wall of the premises, an entry point for an optical fiber while the customer remains inside the premises;
    (c) locating a bore point on the exterior side of an external wall of the premises, corresponding to the customer selected entry point, by an installation technician located outside the premises;
    (d) the installation technician boring a hole through the wall into the premises at the bore point;
    (e) passing an optical fiber through the hole from the outside of the premises to the inside of the premises by the installation technician;
    (f) passing the optical fiber through an aperture in the wall attachment;
    (g) positioning the optical fiber within an expansion anchor having an axial conduit for the optical fiber;
    (h) the customer securing the wall attachment to the interior side of the wall at the entry point using the expansion anchor through which the fiber is positioned to secure the wall attachment to the wall;
    (i) the customer operatively connecting the optical fiber with the optical network terminal;
    (j) the customer mechanically attaching the optical network terminal with the wall attachment, and
    (k) the installation technician remaining outside of the premises during the installation.

2. The method of claim 1 wherein the step of locating said bore point comprises the steps of:
    the customer placing a remote detection target at the selected location; and
    the installation technician detecting the presence of the detection target at the selected location.

3. The method of claim 2 wherein the step of the customer placing a remote detection target comprising the step of placing a radar target adjacent the interior to indicate the entry point, and the step of detecting the presence of the detection target comprises radar scanning the exterior wall to locate the radar target.

4. The method of claim 3 wherein the step of scanning the exterior wall comprises the step of detecting the presence of undesired obstacles in the wall, and instructing the customer to select a different entry point if an obstacle is detected.

5. The method of claim 1 in which the step of securing the wall attachment to the interior side of the wall comprises the step of adhesively securing the wall attachment to the interior side of the wall.

6. The method of claim 1 in which the step of securing the wall attachment to the interior side of the wall comprises the steps of:
    passing the optical fiber laterally through a longitudinal channel along the side of a bushing having an axial cavity for receiving the optical fiber, and passing the optical fiber laterally into a channel along the side of an expansion anchor adapted for insertion into the bushing, such that the bushing and the expansion anchor provide a conduit for the fiber;
    positioning the expansion anchor through the hole; and
    securing the wall attachment to the interior side of the wall by positioning the bushing into the aperture of the wall attachment and pressing the expansion anchor into the bushing.

\* \* \* \* \*